United States Patent

Brew et al.

[11] Patent Number: 6,039,908
[45] Date of Patent: Mar. 21, 2000

[54] METHOD FOR HONEYCOMB EXTRUSION USING A CORRECTED FLOW GRADIENT

[75] Inventors: Thomas W. Brew; Harry A. Kragle, both of Corning, N.Y.

[73] Assignee: Corning Incorporated, Corning, N.Y.

[21] Appl. No.: 08/977,452

[22] Filed: Nov. 24, 1997

Related U.S. Application Data

[60] Provisional application No. 60/032,094, Dec. 4, 1996.

[51] Int. Cl.⁷ ................................................. B29C 47/08
[52] U.S. Cl. ................... 264/177.12; 264/176.1; 264/177.11; 264/209.8; 264/211.11; 425/199
[58] Field of Search ............ 264/177.12, 177.11, 264/209.8, 211.11, 630, 176.1; 425/199, 197, 376.1, 381, 464, 466

[56] References Cited

U.S. PATENT DOCUMENTS

| | | |
|---|---|---|
| 3,284,848 | 11/1966 | Rice . |
| 3,790,654 | 2/1974 | Bagley . |
| 3,885,977 | 5/1975 | Lachman et al. . |
| 3,905,743 | 9/1975 | Bagley . |
| 4,168,944 | 9/1979 | Morikawa et al. ............ 425/464 |
| 4,298,328 | 11/1981 | Frost ........................... 425/376 |
| 4,364,888 | 12/1982 | Levin ........................... 264/177 |
| 4,461,323 | 7/1984 | Morikawa et al. ............ 138/115 |
| 4,814,187 | 3/1989 | Inoue et al. .................. 425/464 |
| 4,846,657 | 7/1989 | Chao ............................ 425/190 |
| 4,992,233 | 2/1991 | Swaroop et al. . |
| 5,011,529 | 4/1991 | Hogue et al. . |
| 5,045,254 | 9/1991 | Peelman et al. ............... 264/48 |
| 5,456,965 | 10/1995 | Machida . |
| 5,499,913 | 3/1996 | Hagino et al. ................ 425/382.4 |

*Primary Examiner*—Jan H. Silbaugh
*Assistant Examiner*—Mark Eashoo
*Attorney, Agent, or Firm*—Kees van der Sterre

[57] ABSTRACT

Apparatus and a method for extruding a honeycomb, providing reductions in curvature or bowing of the extruded honeycomb structure, employs a bow deflector positioned upstream of the extrusion die, the bow deflector comprising adjoining, independently rotatable, first and second aperture plates of tapering thickness, the degree of bow reduction depending on the relative rotational position of the aperture plates and the resulting magnitude of the pressure/flow velocity gradient imparted by the plates on the flow stream entering the die.

3 Claims, 3 Drawing Sheets

METHOD FOR HONEYCOMB EXTRUSION USING A CORRECTED FLOW GRADIENT

This application claims the benefit of U.S. Provisional Application No. 60/032,094, filed Dec. 4, 1996, entitled Method and Apparatus for Honeycomb Extrusion, by Thomas W. Brew and Harry A. Kragle.

BACKGROUND OF THE INVENTION

The present invention relates to extruded honeycomb structures and more particularly to apparatus for extruding honeycombs with improved dimensional accuracy.

The manufacture of inorganic honeycomb structures from plasticized powder batches comprising inorganic powders dispersed in appropriate binders is well known. U.S. Pat. Nos. 3,790,654, 3,885,977, and 3,905,743 show the production of ceramic products using these manufacturing processes, while U.S. Pat. Nos. 4,992,233 and 5,011,529 describe honeycombs of similar cellular structure extruded from batches incorporating metal powders.

A variety of different honeycomb configurations can be formed by extrusion, including curved honeycombs such as disclosed in U.S. Pat. No. 5,456,965. These variations and other geometric properties of the extruded honeycombs can be developed through techniques such as varying the rate of delivery of extrudable material through the die forming the honeycomb. However, the vast majority of worldwide ceramic honeycomb production, which currently serves a large market for honeycomb-supported catalysts used in the abatement of combustion pollution from motor vehicles and stationary combustion sources, is concentrated on the efficient manufacture of honeycombs of right cylindrical configuration. These shapes, which may be of circular, oval, or other closed cylindrical cross-section, are designed to provide straight-through gas-flow channels running exactly parallel to the axis of extrusion.

Ceramic honeycomb substrates for automotive applications are generally produced by cutting and firing individual pieces from a stream of honeycomb extrudate, or by cutting the pieces from a dried green or fired ceramic "log" of extrudate which may be of meter or greater length. To meet customer requirements for the subsequent catalyst coating and "canning" of these substrates in suitable metal enclosures, it is important that the logs and pieces cut from the logs have sides which are absolutely straight and parallel.

The production of a straight stream of extruded material is quite difficult; in most cases at least some "bowing" of the extrudate, attributable to uneven flow of material through the extrusion die, is observed. This bowing can be caused by non-uniform flow characteristics in the batch, but more commonly is due to uneven flow resistance across the face of the extrusion die. Even with careful attention to die fabrication, uneven machining resulting from facts such as progressive tool wear, misalignment of feed holes and discharge slots, and non-uniform exposure to chemical machining and/or plating electrolytes often result in at least some bowing tendency being "built in" to most honeycomb extrusion dies during manufacture.

One prior art approach to the resolution of this problem involves the use of a device called a "bow deflector". This deflector comprises a drilled or otherwise perforated "breaker" or aperture plate installed immediately upstream of the die with respect to the flow direction of the feed stream which has a varying or tapered thickness.

A typical example of a conventional bow deflector of this type is schematically illustrated in FIG. 1 of the drawing. FIG. 1 shows a tapered aperture plate 2 disposed upstream of an extrusion die 4 so that a plasticized powder batch material flowing toward the die in the direction of arrow 6 must traverse apertures 8 in the plate (bow deflector) before reaching the die. The taper in deflector 2 is introduced so that batch material traversing the thickest section of the plate will traverse the longest apertures (8a), and so will experience more flow resistance (a higher pressure drop) and produce less volumetric flow into and through the extrusion die for a given pressure than material traversing the shortest apertures (8b) in the thinnest section of the plate. Apertures in between these two extremes will have an intermediate effect on batch flow to the die.

The end effect of inserting this plate in front of the extrusion die is that the pressure and feed rate of extrudable material to each portion of the die will be inversely proportional to aperture length in the bow deflector behind that portion. This produces a flow velocity gradient across the diameter of the bow deflector in the direction of maximum taper. Given proper alignment of the bow deflector with respect to the die, the flow gradient from the deflector can theoretically counterbalance a pre-existing flow gradient from the die, resulting in an extruded log with much less bend or bow.

While this approach is sound in theory, two problems have been identified in practice. The first problem concerns the direction of the bow and the second concerns the severity of the bow. The taper direction of any bow deflector must of course be aligned to counteract the direction of bow induced by the die. Thus provision must be made for rotating the bow deflector plate behind the die, in order to obtain cancellation of the bowing effects produced by each.

With respect to the severity of bow, the difficulty is that the amount of bow correction available from a given deflector plate is a single, relatively fixed value directly related to the degree of taper of that plate. Within reasonable limits, almost any amount of bow is correctable given the right taper, but experience teaches that the amount of taper angle required to correct a given degree of bow will vary significantly from die to die, and will also vary somewhat depending on the age of the die and of the bow deflector itself. Thus each manufacturing facility must maintain a relatively large and expensive inventory of bow deflectors to meet any extrusion condition which might eventually be encountered in production.

SUMMARY OF THE INVENTION

The present invention overcomes the problem of bow through the use of bow correction apparatus of improved design. That design permits bow correction to be made over a relatively wide range of bowing conditions, and without any need to change bow deflectors or maintain a large inventory of bow correcting hardware.

In a first aspect, the invention includes improved apparatus for the extrusion of honeycomb structures which comprises, in combination, a honeycomb die of any suitable design (which need not be bow-corrected) and a bow deflector comprising multiple aperture plates which co-act to alter the flow of extrudable material to the die in an exact and controllable manner.

As is conventional, the honeycomb extrusion die employed in the apparatus of the invention has an inlet face comprising a plurality of feed holes and an outlet face comprising a discharge opening. The discharge opening is configured in the conventional manner to produce an extrudate of honeycomb configuration from a flow stream of plastic material flowing downstream through the die along an extrusion axis parallel with the direction of extrusion.

The bow deflector, which is positioned in the flow stream immediately upstream of and adjacent the inlet face of the die, comprises adjoining first and second aperture plates. Each of the aperture plates is tapered, varying in thickness from one edge to the other, and each comprises apertures through its thickness aligned in a direction parallel to the extrusion axis. Improved material flow control in accordance with the invention is achieved by providing that each aperture plate is independently rotatable about the extrusion axis with respect to both the die and the other aperture plate. Further, the apertures in each plate, which vary in length due to the tapering plate thickness, are disposed at patterned locations on each plate so that, for at least two and preferably several different rotational orientations of each plate with respect to the other, the apertures in one of the plates will substantially align with the apertures in the other plate. Total aperture length for each set of aligned apertures, being the sum of the individual aperture lengths, will thus depend on the relative rotation of the plates and the combined plate thickness at each aperture location.

Rotating the tapered plates relative to each other will change the amount of bow correction available (with some incidental change of bow direction), by increasing or decreasing the differential in total aperture length between the longest and shortest aperture sets across the bow deflector. Rotating the plates as a pair, on the other hand, will simply change the direction of bow correction. Through a combination of relative and paired plate rotation, the flow velocity gradient across the face of the feed stream exiting the plate pair and entering the extrusion die may be controlled as to both magnitude and direction.

In the second aspect the invention comprises an improved method for extruding a honeycomb structure from a plasticized powder batch material. In accordance with that method, a feed stream of the plasticized powder batch material is first directed along an extrusion path through a first plurality of apertures in a first rotatable aperture plate disposed across the feed stream. These first apertures have a flow resistance which varies across the diameter of the aperture plate, thereby impressing a first flow velocity or pressure drop gradient across the face of the feed stream traversing the plate.

Thereafter, the feed stream of plasticized batch material having the first flow velocity or pressure drop gradient is directed through a second plurality of apertures in a second rotatable aperture plate. As in the case of the first plate, the second apertures will also have a flow resistance which varies across the diameter of the second plate, thereby superimposing a second flow velocity or pressure drop gradient on the first flow velocity or pressure drop gradient as the feed stream traverses the second plate. The result of these superimposed pressure drop gradients is that a flow velocity gradient is developed across the face of the feed stream by passage through the two plates.

Finally, the feed stream with the flow velocity gradient is directed into and through the honeycomb extrusion die. Advantageously, since the first and second aperture plates are rotatable, the flow velocity gradient in the feed stream delivered to the extrusion die can be adjusted in magnitude and direction to counteract any flow velocity gradient developed within the die which would otherwise tend to produce bowing in an extruded honeycomb.

DESCRIPTION OF THE DRAWINGS

The invention may be further understood by reference to the drawings, wherein.

DETAILED DESCRIPTION

In a particularly preferred embodiment of the invention the bow deflector comprises two rotatable aperture plates in a unitary assembly consisting of a front tapered plate and a rear tapered plate held in a plate holder. The front tapered plate incorporates a distinctive pattern of apertures, and the rear tapered plate exactly mimics the front one in terms of the pattern of apertures. As previously noted, the aperture patterns used are selected in order to secure the desired alignment between the apertures in the plates in selected rotational positions of the plates, as hereinafter more fully described.

Figure 1:
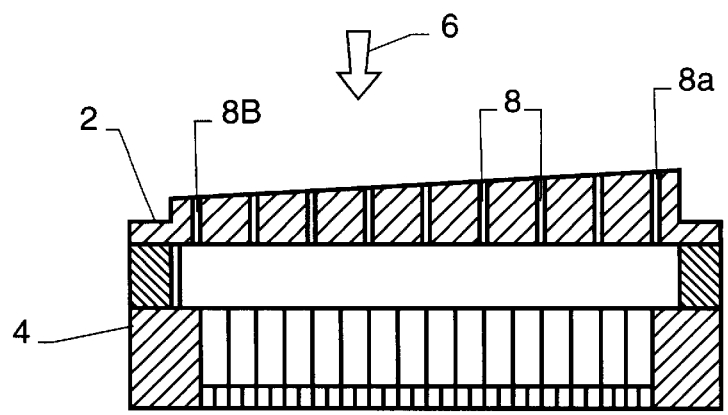
FIG. 1 is a schematic view of extrusion apparatus incorporating a tapered plate bow deflector of the prior art.
Figure 2A:
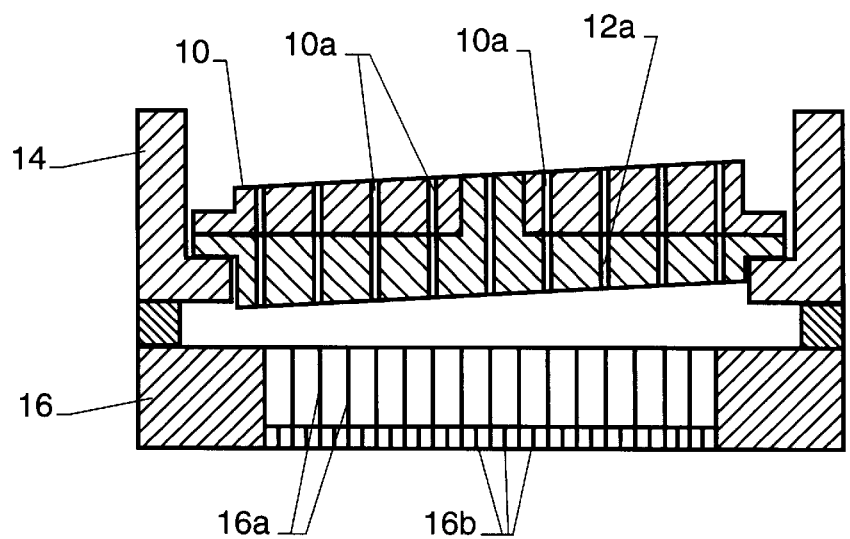
FIGS. 2a–2b are schematic side view illustrations of extrusion apparatus incorporating a bow deflector assembly in accordance with the invention.
Figure 2B:
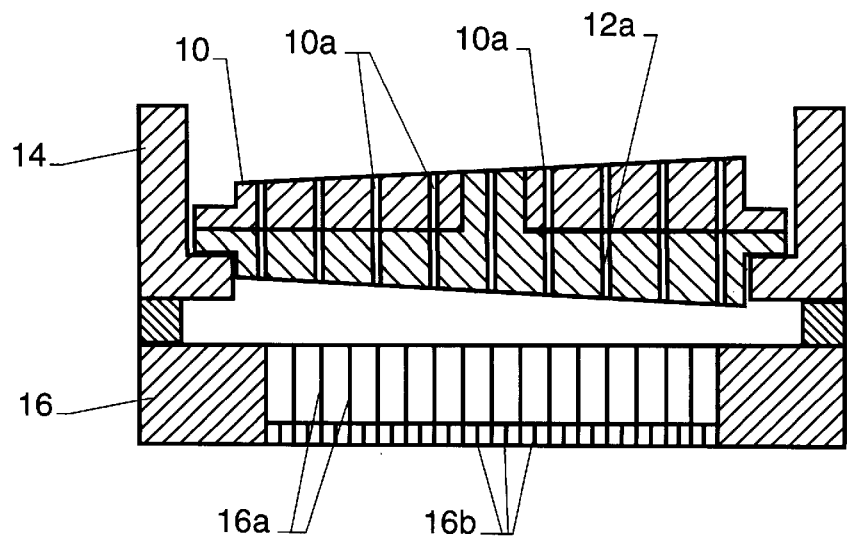

FIGS. 2a and 2b are schematic side elevational views of extrusion apparatus incorporating a plate/holder assembly of the presently preferred type. These views are intended to illustrate the manner in which the flow velocity of a stream of plasticized batch material can be adjusted depending upon the orientation of the plates. In both figures, upstream tapered plate 10 incorporating apertures 10a is positioned directly against and in contact with downstream tapered plate 12 incorporating apertures 12a, both plates being supported at their edges by plate holder 14. This assembly is located upstream of an extrusion die 16 to which the material traversing the assembly is supplied, that material being introduced into die feed holes 16a and extruded from die discharge slots 16b to form a honeycomb product from the material.

The spacing between tapered plate assembly 10,12 and the inlet face of extrusion die 16 can readily be adjusted for optimum extrusion performance. Too much spacing allows the bow-correcting flow gradient developed at the plate assembly to dissipate before the flow stream reaches the die, while too small a spacing can result in a patterning of the extruded honeycomb material caused by the aperture pattern in the plate assembly. Spacing on the order of 0.5 inches (12 mm) works well in practice.

In FIG. 2a, tapered plates 10 and 12 are aligned in holder 14 so that their tapers are opposed. In this alignment, termed the null position, the net feed stream flow velocity gradient developed by the assembly is essentially zero since the combined taper angle of the assembly is zero and the length of all aperture combinations 10a–12a is substantially equivalent. Thus the gradients in pressure drop developed by each of the plates cancel each other.

In FIG. 2b, tapered plates 10 and 12 are aligned in holder 14 in the maximum-correction position. In this position the individual plate tapers add to provide the largest possible combined taper angle and largest difference in combined aperture length between the aperture combinations 10a–12a at the top of the assembly and combinations 10a–12a at the bottom of the assembly as shown. In this alignment, the plate assembly will impart the maximum flow velocity gradient across the feed stream achievable with the amount of plate taper provided. Of course, any angular positioning of the two plates between the extremes shown in FIGS. 2a and 2b will produce an intermediate combined taper angle, and thus an intermediate amount of bow correction on a feed stream traversing the assembly.

In the apparatus embodiment shown in FIGS. 2a and 2b, the degree of taper is identical for each of the two plates. It will be recognized, however, that differing tapers can be used for the plates without loss of the ability to adjust the combined taper angle for variable levels of bow correction in accordance with the invention. The only significant performance difference in this type of system is that a true null position insuring complete cancellation of the effect of the tapered plates is not readily available.

Maximum flexibility in extrusion apparatus provided in accordance with the invention would require that the relative alignment of the two tapered aperture plates be infinitely variable. However, in practice there is a need to provide hole patterns in the plates which will completely align, in order to avoid flow impedance from the assembly which does not contribute to bow correction. This requirement dictates the use of aperture patterns which are periodically repeated on succeeding angular sectors of each plate.

It is possible to utilize multiple bow deflectors in series to increase both the extent and precision of bow correction available. For example, two deflectors, each capable of correcting for a 2-degree bow, could provide 4 degrees of bow correction while greatly multiplying the number of intermediate plate rotation combinations available to correct intermediate levels of bow. However, while a series of deflectors could in theory exactly correct essentially any amount of bow, dies requiring more than about 4 degrees of bow correction will not normally be used for commercial honeycomb production.

Figure 3A:
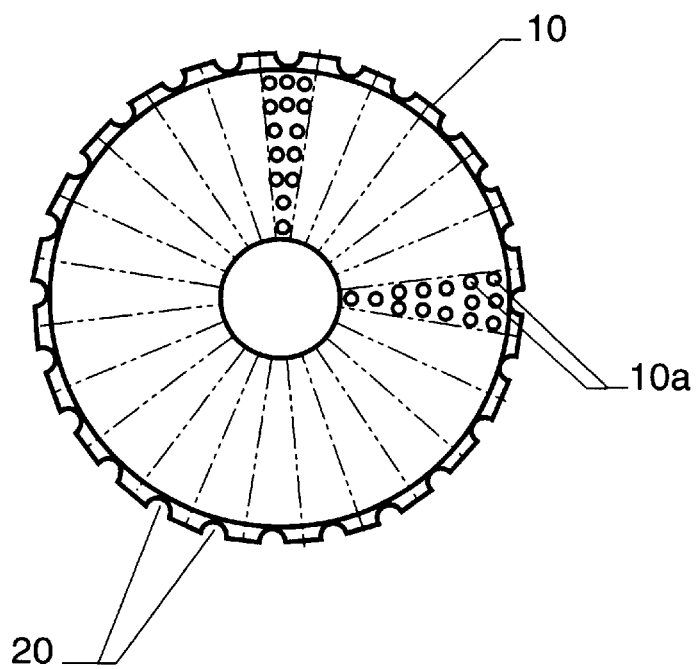
FIGS. 3–5 are schematic side and top view illustrations of the components of a bow deflector assembly provided in accordance with the invention.
Figure 3B:
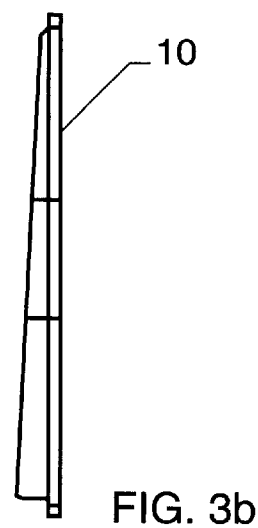
Figure 4A:
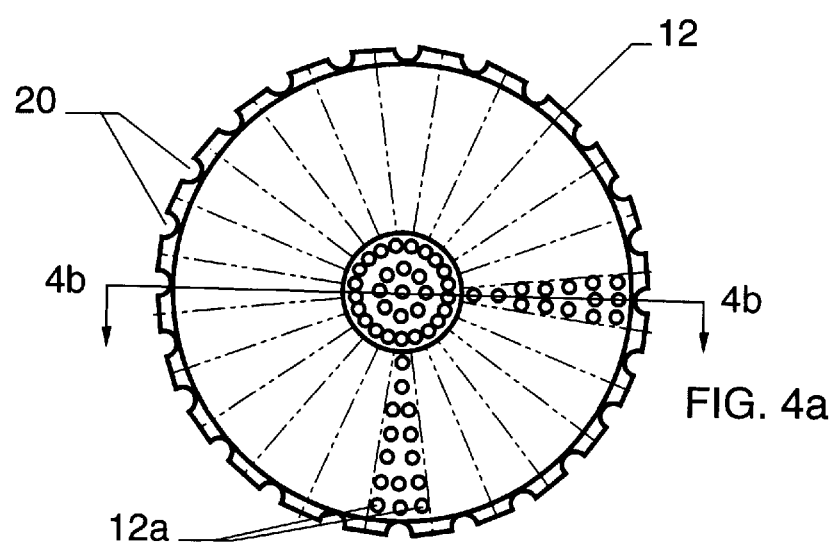
Figure 4B:
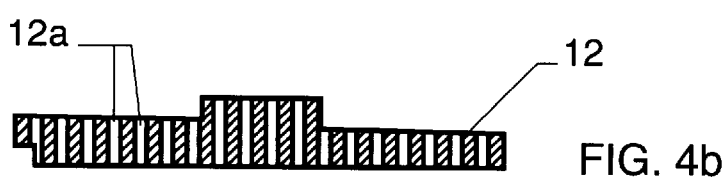
Figures 5A, 5B:
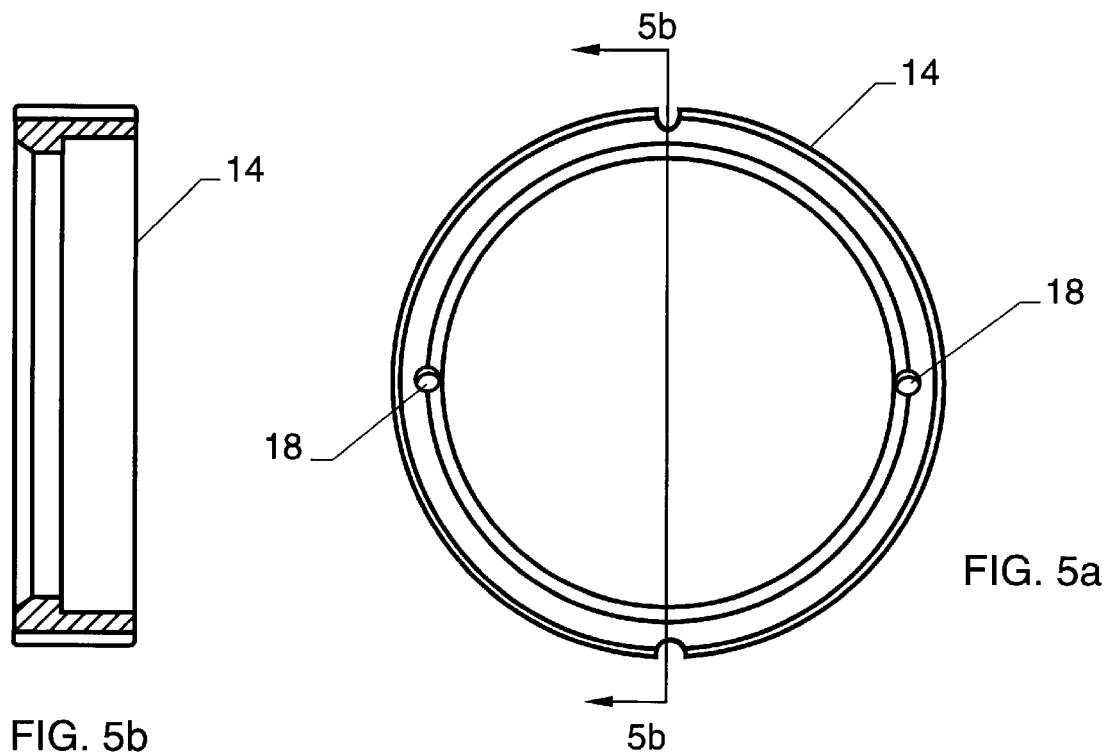

A specific embodiment of a design for a bow deflector assembly comprising aperture plates having a suitable repeating aperture pattern is illustrated in FIGS. 3–5 of the drawings. FIGS. 3a–3b and FIGS. 4a–4b are schematic top plan and side elevational views of tapered aperture plate designs for use in the assembly, while FIGS. 5a–5b are corresponding top and side views of a plate holder design for the assembly.

The degree of bow correction flexibility provided in the design shown is dictated by the frequency of the repeat pattern of the apertures 10a and 12a provided in tapered aperture plates 10 and 12 in FIGS. 3a–3b and 4a–4b, respectively. The pattern of apertures 10a in tapered upstream aperture plate 10 in FIGS. 3a–3b, which is mirrored by the pattern of apertures 12a in tapered downstream aperture plate 12, is exactly repeated within each 15-degree sector of each plate, providing a 24-fold repetition around the circumference of each plate. With this aperture pattern, the apertures in the two plates will align exactly in each of 24 possible relative angular positions of the plates. This arrangement gives 13 discrete relative plate angles, including the maximum and minimum combined taper angles but excluding duplicate intermediate taper angles provided at some of the 24 possible relative plate alignments around the circle.

The plate taper angle can of course be selected to provide a maximum combined taper angle sufficient to achieve any desired degree of correction bow correction. For example, if bow correction of up to 3 degrees of bow in the extrudate is required, this plate design will provide discrete control steps ranging from zero to 3 degrees in increments of one-quarter degree.

In the presently preferred embodiment of the bow deflector of the invention the relative alignment of the tapered aperture plates will be fixed by the plate holder to avoid unintended movement of the plates in use. As shown in FIGS. 5a–5b, one design for fixing the relative alignment of the plates is by means of dowel pins 18 fixed in holder 14. These dowels engage with edge indentations 20 in plates 10 and 12 shown in FIGS. 3a and 4a, respectively.

The direction of bow correction provided by apparatus such as herein described can in principle be made infinitely variable. However, a satisfactory and more practical approach is to allow for bow correction only in the directions corresponding to the discrete plate angles permitted by the plate holder. Thus, in the assembly of FIGS. 3–5 of the drawings, the plate pair at any preselected relative angular orientation of the two plates can be rotated as a unit to any of the 24 positions at which dowel pins 18 will engage plate edge indentations 20. The direction of bow correction can therefore be set in 15-degree increments, thus matching any actual bow angle to within 7.5 degrees.

It is permissible if desired to provide an aperture pattern wherein the apertures within each sector of the plates vary slightly in diameter. In fact the optimum aperture size, location, and pattern will typically be adjusted, either by detailed computation or by routine experiment, to provide substantially uniform flow velocity across the deflector assembly at least at the null or zero combined taper angle of the aperture plates. This approach will ensure that any correction imparted by the bow deflector is solely a function of the taper, and not a by-product of flow inequalities inadvertently caused by sub-optimal aperture geometry.

While the 15-degree repeat pattern of the above-described apparatus is particularly useful, there will be extrusion applications for which this degree of flow control is not required. For those applications, 30-degree or even 45-degree repeat patterns are useful, and may in fact be easier to develop in terms of hole size, spacing and positioning. The only disadvantage of such designs is that the number of control increments in these two instances are reduced to 7 and 5 relative plate positions only.

The use of regularly spaced plate apertures of circular cross-section, readily provided by conventional drilling processes and equipment, has economic advantages in terms of the cost and consistency of the aperture plates employed. However, there may be applications wherein irregularly shaped holes, or holes otherwise not available with conventional rotating tooling may offer performance advantages. In fact the method of the invention is not strictly limited to the use of tapered aperture plates with circular apertures, since pressure and flow velocity gradients in streams of plasticized batch materials can be induced by controlled gradients in hole size or shape as well as hole length. While such alternative approaches will tend to complicate both the hole drilling process and the types of flow patterns obtainable, they may be resorted to where tapered plates or standard aperture patterns do not provide the specific types of flow control which are required.

The advantages of extrusion apparatus provided in accordance with the invention will be evident to those skilled in the art. A single bow deflector assembly built in accordance with the invention will address a broad range of extrusion conditions requiring bow correction, rather than a single condition, and will thereby minimize the inventor of corrective hardware required. Further, when corrections in either the degree or the direction of bow are required, those corrections can be made with a single assembly of known characteristics, reducing the need to characterize and catalog an entire inventory of deflector plates.

We claim:

1. A method for forming a honeycomb structure from an extrudable material which comprises:
   directing a feed stream of the material along an extrusion path through a first plurality of apertures in a first aperture plate disposed across the feed stream, the first apertures having varying flow resistance across the first aperture plate to impart a first flow velocity or pressure drop gradient across the width of the feed stream;
   thereafter directing the feed stream through a second plurality of apertures in a second aperture plate, the second apertures having varying flow resistance across the second aperture plate to superimpose a second pressure drop or flow velocity gradient on the first pressure drop or flow velocity gradient across the width of the flow stream; and thereafter directing the feed stream with superimposed first and second pressure drop or flow velocity gradients through a honeycomb extrusion die.

2. A method in accordance with claim 1 wherein the first and second apertures have the same aperture diameter and shape, and wherein the varying flow resistance across each plate results from variations in aperture length across each plate.

3. A method in accordance with claim 1 wherein the first and second apertures are of varying aperture diameter or shape, and wherein the varying flow resistance across each plate results from variations in aperture diameter or shape across each plate.

* * * * *